(12) United States Patent
Sasaki (10) Patent No.: US 7,463,292 B2
(45) Date of Patent: Dec. 9, 2008

(54) LENS SYSTEM

(75) Inventor: Tadashi Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 618 days.

(21) Appl. No.: 11/069,557

(22) Filed: Mar. 2, 2005

(65) Prior Publication Data

US 2005/0195311 A1   Sep. 8, 2005

(30) Foreign Application Priority Data

Mar. 4, 2004   (JP) ............... P.2004-060722

(51) Int. Cl.
*H04N 5/262* (2006.01)
(52) U.S. Cl. .................. 348/240.99; 348/345
(58) Field of Classification Search ........... None
See application file for complete search history.

(56) References Cited

U.S. PATENT DOCUMENTS 7,170,547 B2 * 1/2007 Uchiyama et al. ............ 348/49

2003/0227555 A1 * 12/2003 Kobayashi et al. ........ 348/231.6

FOREIGN PATENT DOCUMENTS

JP   3478740 B2   10/2003

OTHER PUBLICATIONS

Urbanek, M.; Horaud, R.; Sturm, P., Combining off- and on-line calibration of a digital camera, Jun. 2001, 3-D Digital Imaging and modeling, 2001. Proceedings. Third International Conference on May 28, 2001, pp. 99-106.*

* cited by examiner

*Primary Examiner*—Tuan V Ho
(74) *Attorney, Agent, or Firm*—Harness Dickey & Pierce (57) ABSTRACT

To provide a lens system which is to be used with a virtual system and which can curtail time and labor required by settings of the virtual system by outputting data pertaining to an angle of view, an object distance, and a principal point position, all being required by the virtual system, the lens device of an actual camera used for photographing an actual video to be used by the virtual system includes a CPU determining information about the angle of view, the object distance, and the principal point position, all being required to set a virtual camera in the virtual system, on the basis of a zoom position and a focus position detected by encoders, and transmits the information to the virtual system.

10 Claims, 4 Drawing Sheets

DATA OF ANGLE OF VIEW

| FOCUS POSITION \ ZOOM POSITION | 0 | 200 | 400 | 600 | 800 | ... | 20000 |
|---|---|---|---|---|---|---|---|
| 0 | 0.62898 | 0.61231 | 0.59629 | 0.58087 | ***** | ... | ***** |
| 200 | 0.62792 | 0.61130 | 0.59532 | 0.57993 | ***** | ... | ***** |
| 400 | 0.62687 | 0.61028 | 0.59434 | 0.57899 | ***** | ... | ***** |
| 600 | 0.62581 | 0.60927 | 0.59337 | 0.57806 | ***** | ... | ***** |
| 800 | ***** | ***** | ***** | ***** | ***** | ... | ***** |
| ⋮ | ⋮ | ⋮ | ⋮ | ⋮ | ⋮ | ⋱ | ***** |
| 20000 | ***** | ***** | ***** | ***** | ***** | ***** | ***** |

FIG. 2B

DATA OF PRINCIPAL POINT POSITION

| FOCUS POSITION \ ZOOM POSITION | 0 | 200 | 400 | 600 | 800 | ... | 20000 |
|---|---|---|---|---|---|---|---|
| 0 | -146.53 | -145.41 | -144.25 | -143.07 | ***** | ... | ***** |
| 200 | -146.48 | -145.36 | -144.20 | -143.02 | ***** | ... | ***** |
| 400 | -146.43 | -145.30 | -144.15 | -142.96 | ***** | ... | ***** |
| 600 | -146.38 | -145.25 | -144.10 | -142.92 | ***** | ... | ***** |
| 800 | ***** | ***** | ***** | ***** | ***** | ... | ***** |
| ⋮ | ⋮ | ⋮ | ⋮ | ⋮ | ⋮ | ⋱ | ***** |
| 20000 | ***** | ***** | ***** | ***** | ***** | ***** | ***** |

LENS SYSTEM

FIELD OF THE INVENTION

The present invention relates to a lens system, and more particularly, to a lens system applied to a video synthesis system (or video processing system), such as a virtual studio.

BACKGROUND OF THE INVENTION

A technique for combining a live video captured by a television camera with an electronic image, or the like, generated by a computer is heavily used in recent TV broadcasts. A commonly-known technique for synthesizing videos (images) is a chromakey synthesis technique. According to this technique, when an image which would be a foreground subject of a synthesized image, such as a person, is acquired as a live video, the foreground subject is located in front of, e.g., a blue canvas (blue background), and captured by a television camera. As a result, a key signal to be used for distinguishing the area of the foreground subject from the area of the blue background is generated from the video signal. In accordance with the key signal, the image about the area of the blue background is replaced with a background image generated by a computer or the like or a background image captured at a different time or in a different location, whereby the foreground subject and the background image are merged together.

In recent years, in addition to mere merging of videos by means of chromakey synthesis, a video synthesis system (virtual system) called a virtual studio has come into frequent use. In this system, a subject captured by a television camera as a live video is made to appear to actually exist in a virtual space (virtual studio) generated as an electronic video.

In the virtual system, a desired virtual space is generated by a computer or the like, and a virtual camera (imaginary camera) is placed within the virtual space. Thereby, photography of the inside of the virtual space is imaginarily carried out by the virtual camera, so that an electronic video of the virtual space is generated.

Further, in the virtual system, photographing conditions of the virtual camera are changed in the same manner as are photographing conditions for a camera work, such as zooming action, focusing action, and pan-and-tilt action of a television camera for capturing a live video (called a live camera). An electronic video of the virtual space associated with the camera work of the live camera is generated by the virtual camera.

The electronic video of the virtual space generated by the virtual camera is merged with the live video captured by the live camera by means of chromakey synthesis or the like, thereby generating a synthesis image showing that the subject of the live video appears to exist in the virtual space.

Many of such virtual systems require information about an angle of view, an object distance (i.e., a distance from a taking lens of a live camera to an object (or subject)), and a principal point position as photographing data which show settings of photographing conditions of the live camera, in order to cause the photographing conditions of the live camera to accurately coincide with those of the virtual camera. In some of the related-art virtual systems, information about a zoom position and a focus position of a taking lens detected by a position sensor, such as an encoder, as described in Japanese Patent No. 3478740, is delivered directly to the virtual system. The information, however, does not directly show an angle of view, an object distance, or a principal point position.

For this reason, in the virtual system requiring information about an angle of view, an object distance, and a principal point position with respect to a live camera, the angle of view, the object distance, and the principal point position are computed on the basis of the information about the zoom position and the focus position acquired from the taking lens (lens device) of the live camera.

Computation requires lens data unique to a lens device (a lens device used in the virtual system). The lens data must have been generated and registered in the system in advance.

Currently, generation and registration of lens data are performed by the user. For instance, an actual measurement subject used for actually measuring an angle of view, an object distance, and a principal point position is photographed through use of, e.g., a television camera to be used for photographing an actual image. Images are acquired at various positions by changing the zoom position and focus position of the taking lens. The angle of view, the object distance, and the principal point position at each of the zoom and focus positions are actually measured from the captured images. Lens data representing a relationship among the zoom position, the focus position, the angle of view, the object distance, and the principal point position are generated through actual measurement. The lens data are then stored in memory to which the virtual system makes reference.

At the time of actual photographing of a live video, an angle of view, an object distance, and a principal point position, all corresponding to a zoom position and a focus position given by the taking lens (lens device) of the actual camera, are determined from the lens data. Photographing conditions of a virtual camera are set on the basis of the angle of view, the object distance, and the principal point position. Thus, the photographing conditions of the virtual camera are changed in accordance with settings of the photographing conditions of the actual camera, and an electronic video in a virtual space generated by the virtual camera is changed in association with a camera work of the actual camera. When a photographing direction (a pan-and-tilt position) of the actual camera is changed by means of a pan head or the like, information about the pan-and-tilt position output from the pan head is delivered to the virtual system, whereby the photographing direction of the virtual camera is also changed.

However, when the angle of view, the object distance and the principal point position are computed from information about the zoom position and the focus position, both being detected by the position sensor of the lens device, as in the related-art virtual system, the user must perform operation for actually measuring the lens data representing the relationship among the zoom position, the focus position, the angle of view, the object distance, and the principal point position and storing the lens data beforehand. These operations sometimes involve consumption of at least several hours or up to several days. Thus, the operations require much time and labor. Positions, such as the zoom position and the focus position, at which an angle of view, an object distance, and a principal point position are actually measured, require at least several points up to tens of points. If the number of points is reduced for saving time, there will arise a so-called slippage phenomenon of a mismatch occurring between a live video and an electronic video.

SUMMARY OF THE INVENTION

The present invention has been conceived under the circumstances and aims at providing a lens system which makes it unnecessary for a video processing system to compute photographing data when the lens system is used in a video processing system, such as a virtual system, that requires photographing data including at least principal point position, to thus curtail time and labor required by settings, such as advance measurement and registration, by a user, of lens data to be used for computing photographing data; and which provides photographing data with high accuracy.

To achieve an object of the present invention, the present invention provides a lens system for controlling zooming and focusing of a taking lens (or photographing lens), including: a first position detection unit for detecting a zoom position of the taking lens; a second position detection unit for detecting a focus position of the taking lens; a computing unit for computing one set or a plurality of sets of photographing data including at least a principal point position among an angle of view or focal length of the taking lens, an object distance (a distance from the taking lens to an object (or subject)), and the principal point position of the taking lens, on the basis of the zoom position and the focus position detected by the first position detection unit or the second position detection unit; and an output unit for outputting the photographing data computed by the computing unit.

According to the present invention, when the lens system of the present invention is used for a video processing system such as a virtual system, photographing data, such as a principal point position, required by the video processing system are computed within the lens system. Therefore, the video processing system does not need to perform arithmetic operation of the photographing data. Further, data unique to the lens, which are required by arithmetic computation, can be set in the lens system beforehand (before shipment from the factory or the like). Hence, high-precision photographing data can be offered to the video processing system without imposing burdensome operation on the user.

The lens system of the present invention may further include a storage unit that stores in advance lens data showing a relationship among the zoom position, the focus position, and the photographing data computed by the computing unit, wherein the computing unit computes the photographing data through use of the lens data stored in the storage unit. Specifically, the lens data required to compute the photographing data are generated beforehand (before shipment from the factory or the like) and stored in the storage unit.

The lens data may include a design value determined from design data of the photograph lens or actual measurement data obtained through actual measurement. When the lens data are generated and stored in the storage unit, the lens data may be generated through theoretical arithmetic operation on the basis of design data of the taking lens or may be generated through actual measurement. Generation of the lens data through actual measurement entails consumption of labor; however, more accurate photographing data involving less influence of manufacturing errors can be offered to an external system.

The lens system of the present invention may have a taking lens having an adjustment unit for adjusting a flange back, and a compensation unit for compensating a change in the photographing data stemming from the adjusting of the flange back. According to the present invention, even when an optical characteristic is changed by means of flange back adjustment, highly-accurate photographing data can be offered to an external system.

The output unit may output the photographing data to a virtual system. The lens system of the present invention is particularly effective when used in a virtual system requiring photographing data to be used for setting photographing conditions of a virtual camera, such as an angle of view, an object distance, and a principal point position, all pertaining to an actual camera.

According to the lens system of the present invention, when the lens system is used in a video processing system, such as a virtual system, the video processing system does not need to compute the required photographing data. Therefore, the time and labor required by settings, such as advance measurement and registration, by the user, of lens data required to compute the photographing data are curtailed. Moreover, high-precision photographing data can also be offered.

DETAILED DESCRIPTION OF THE INVENTION

A preferred embodiment of a lens system according to the present invention will be described in detail hereinbelow by reference to the accompanying drawings.

Figure 1:
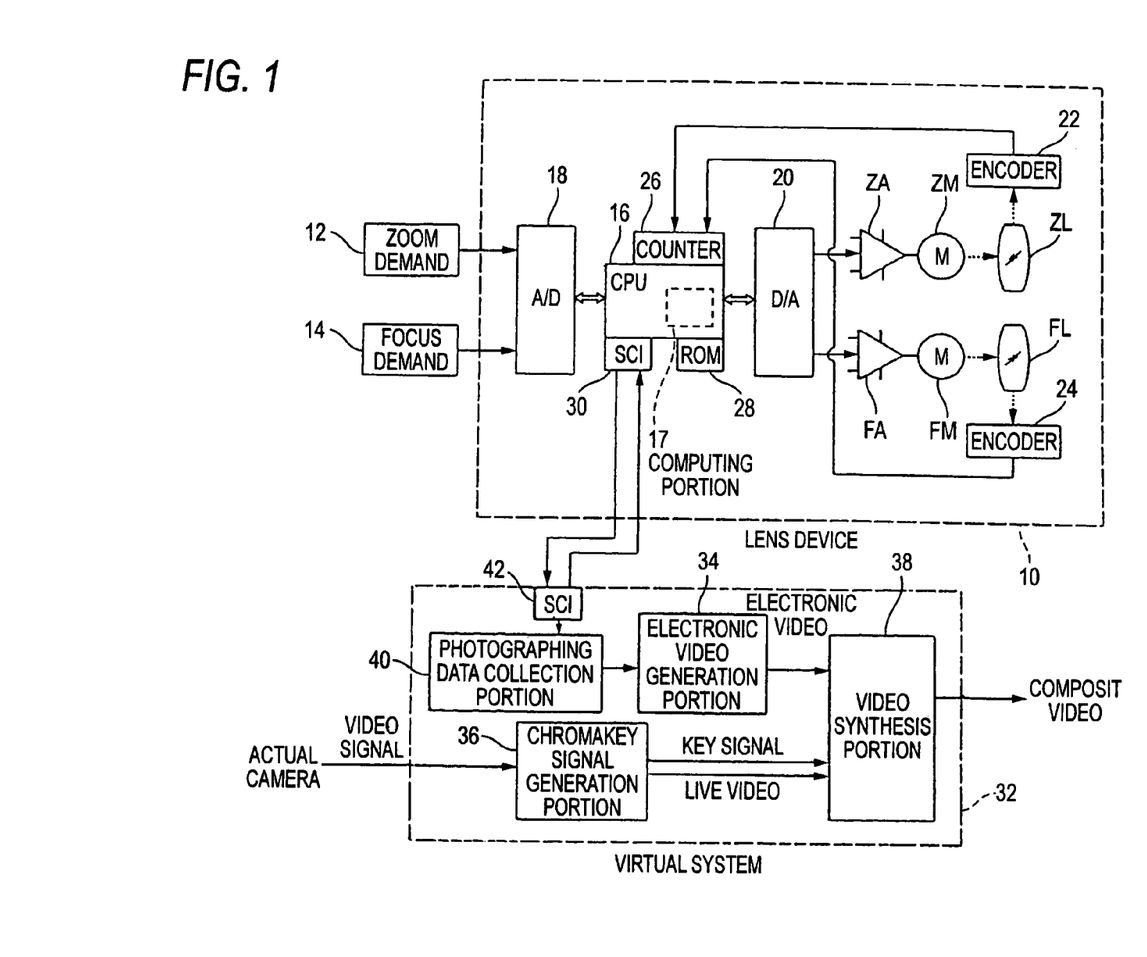
FIG. 1 is a block diagram showing the configuration of a lens system to which the present invention is applied and the configuration of a virtual system.

FIG. 1 is a block diagram showing the configuration of a lens system to which the present invention is applied, as well as the configuration of a virtual system.

The overview of a virtual system 32 will first be described. As illustrated in the drawing, the virtual system 32 is so-called a virtual studio. In this system, an actual video photographed with a blue background by means of a video camera for broadcasting or commercial purpose (i.e., an actual camera) is merged with an electronic video of a virtual space (i.e., a virtual studio) generated by a computer or the like, through use of a chromakey synthesis technique. This system photographs an actual image by means of the actual camera, and simultaneously generates a composite image.

As illustrated in the drawing, the virtual system 32 includes an electronic video generation portion 34, a chromakey signal generation portion 36, a video synthesis portion 38, a photographing data collection portion 40, and the like. Before use of the virtual system 32, generation data used for establishing a desired virtual space are generated, and generation data pertaining to the virtual space are set so that the data can be read by the electronic video generation portion 34. Moreover, the video signal output from the actual camera is set so that the signal can be input to the chromakey signal generation portion 36.

When an actual image is photographed by an actual camera, an actual subject (i.e., a foreground subject (or object)) supposed to be located within the virtual space by means of the composite image is photographed by the actual camera with a blue background being used as a background. At that time, the zoom or focus of the actual camera is operated, to thus photograph the foreground subject by means of a desired camera work. Here, when the actually-photographed video and the electronic video are merged, the subject of the actually-photographed video does not always come to the foreground; however, the subject is still called a foreground subject.

At the time of photographing of an actual video using an actual camera, a video signal output from the actual camera is input to the chromakey signal generation portion 36. On the basis of the input video signal, the chromakey signal generation portion 36 generates a key signal to be used for distinguishing the area of the foreground subject in the actually-photographed image from the area of the blue background, and provides the key signal to the video synthesis portion 38. Further, the chromakey signal generation portion 36 sends the video signal input (live video) from the actual camera, in unmodified form, to the video synthesis portion 38.

Meanwhile, the electronic video generation portion 38 sets up a virtual camera within the virtual space, and generates an electronic video of the virtual space to be photographed by the virtual camera on the basis of the generation data pertaining to the virtual space. The video signal is delivered to the video synthesis portion 38.

On the basis of the key signal, the video synthesis portion 38 specifies the area of the blue background of the actually-photographed video originating from the video signal output from the actual camera, and replaces the image of the area with the electronic video given by the electronic video generation portion 34. As a result, a video signal of the composite video—into which the actually-photographed video of the foreground subject and the electronic video of the virtual space are merged—is generated, and the video signal is output from the video synthesis portion 38. The video signal of the composite video output from the video synthesis portion 38 is output to another piece of video equipment, such as a VTR, from the virtual system 32 as a video signal for recording or playback purpose.

The photographing data collection portion 40 establishes communication with a lens device 10 used in the actual camera by way of an SCI (serial communication interface) 42. Information (photographing data) to be used for ascertaining settings of photographing conditions of the actual camera is acquired from the lens device 10. The thus-acquired photographing data are imparted to the electronic video generation portion 34. In the related-art virtual system, data pertaining to a zoom position and a focus position of the taking lens are acquired from the lens device 10. However, in the present embodiment, data pertaining to an angle of view, an object distance, and a principal point position are acquired in a manner to be described later. In addition to the information about the angle of view, the object distance, and the principal point position, the information required to ascertain settings of the photographing conditions of the actual camera is acquired by the photographing data collection portion 40. For instance, when the actual camera is panned or tilted through use of a pan head, data pertaining to the pan/tilt position are also acquired from the pan head. Information about brightness, such as an "f" number, is often acquired from the lens device 10. In the present embodiment, explanation is given to a case where only information about an angle of view, an object distance, and a principal point position is acquired from the lens device 10.

As mentioned previously, when the electronic video generation portion 34 generates an electronic video of a virtual space on the assumption of the virtual camera, photographing conditions of the virtual camera are set on the basis of the photographing data given by the photographing data collection portion 40. Specifically, the angle of view, the object distance, and the principal point position, all pertaining to the virtual camera, are changed in accordance with the settings pertaining to the angle of view, the object distance, and the principal point position, all pertaining to the actual camera. Thereby, the electronic video of the virtual space associated with the camera work of the actual camera is generated, and the electronic video and the actually-photographed video from the actual camera are merged by the video synthesis portion 38, whereby a natural composite video is generated.

The lens system used for the actual camera of the virtual system 32 will now be described. The lens system includes the lens device 10 equipped with the taking lens (optical system) whose detailed configuration is omitted, and a control system; and controllers such as a zoom demand 12 and a focus demand 14, the controllers being connected to the lens device 10.

The taking lens of the lens device 10 is attached to a camera main body (not shown) which is used for broadcast video photographing or commercial video photographing and which enables replacement of a lens, by means of a mount. An image of a subject (or object) is formed on a light-receiving surface of an image capturing element provided on the camera main body by means of the taking lens.

In the taking lens, a zoom or variable power lens (or lens group) ZL and a focus lens (or lens group) FL are arranged so as to be movable in the direction of the optical axis. The lenses ZL, FL are moved in the direction of the optical axis by means of driving force of motors ZM, FM coupled to the lenses. When the zoom lens ZL is moved by means of the motor ZM, a zooming factor (i.e., a focal length) of the taking lens is changed, whereby the angle of view for photographing is changed. When the focus lens FL is moved by means of the motor FM, the position of focus of the taking lens is changed, whereby an object distance over which the focus is acquired (i.e., a distance from the taking lens to the subject or a photographing distance) is changed.

An embodiment of the lens system of the present invention includes position detection portions 22, 24 and 26, a computing portion 17, an output portion 30, and a storage portion 28. The position detection portion 22 and 24 perform a function of detecting a zoom or focus position of the taking lens. The computing portion 17 performs a function of computing photographing data that contains an angle of view, an object distance and a principal point position both pertaining to the taking lens, based on the zoom and focus positions of the taking lens. The output portion 30 performs a function of outputting the photographing data. The storage portion 28 performs a function of storing lens data which show a relationship among the photographing data, the zoom position and the focus position.

More specifically, as illustrated in the drawing, the control system of the lens device 10 includes a CPU 16 containing the computing portion 17, an analog-to-digital converter 18, a digital-to-analog converter 20, amplifiers ZA and FA, encoders 22 and 24 as part of the position detection portions, ROM as the storage portion 28, and the like. A command signal output from the zoom demand 12 or the focus demand 14, both being connected to the lens device 10, is input to the analog-to-digital converter 18. A zooming operation commanded by a cameraman or a like person is performed by the zoom demand 12, and a zoom command signal indicating a target value pertaining to the position or moving speed of the zoom lens ZL is output from the zoom demand 12 in response to the operation. A focusing operation commanded by the cameraman or a like person is performed by the focus demand 14, and a focus command signal indicating a target value pertaining to the position or moving speed of the focus lens FL is output from the focus demand 14 in response to the operation.

The zoom command signal and the focus command signal are converted from analog signals into digital signals by means of the analog-to-digital converter 18, and the thus-converted signals are provided to the CPU 16.

The zoom command signal and the focus command signal, both being provided to the CPU 16 for commanding the zooming and focusing operations, may be imparted not by the zoom demand 12 and the focus demand 14 but by another device, such as a computer connected to the CPU 16 by means of communication such as serial communication.

In accordance with the zoom command signal imparted by the zoom demand 14, the CPU 16 outputs a zoom control signal to the digital-to-analog converter 20. After the zoom control signal has been converted into a digital signal by the digital-to-analog converter 20, the thus-converted digital signal is imparted to the amplifier ZA. Thereby, the motor ZM is driven in accordance with the zoom control signal, and the zoom lens ZL is moved. Further, in accordance with the value of the zoom command signal or the status (position or speed) of the zoom lens ZL, the value of the zoom control signal is adjusted by the CPU 16, whereby the status of the zoom lens ZL is controlled so as to assume a target value imparted by the zoom command signal.

Likewise, the CPU 16 outputs a focus control signal to the digital-to-analog converter 20 in accordance with the focus command signal imparted by the focus demand 14. After the focus control signal has been converted from the digital signal into an analog signal by means of the digital-to-analog converter 20, the thus-converted analog signal is imparted to the amplifier FA. Thereby, the motor FM is driven in accordance with the focus control signal, and the focus lens FL is moved. Further, the value of the focus control signal is adjusted by the CPU 16 in accordance with the value of the focus command signal and the status (position or speed) of the focus lens FL. Thereby, the status of the focus lens FL is controlled so as to assume the target value imparted by the focus command signal.

The control system of the lens device is provided with the encoders 22, 24 as position sensors for detecting the position of the zoom lens FL and that of the focus lens FL. For instance, an incremental-type rotary encoder is used for the encoders 22, 24. Rotary detection shafts of the rotary encoders are coupled to output shafts of the motors ZM, FM. Thereby, every time the zoom lens ZL moves over a unit distance in the positive or negative direction (i.e., a wide direction or a telescopic direction), the encoder 22 outputs a pulse signal indicating the positive or negative sign of the moving direction and that the zoom lens has moved over the unit distance. Every time the focus lens FL moves over a unit distance in the positive or negative direction (the direction of a close range or the direction of infinity), the encoder 24 outputs a pulse signal indicating the positive or negative sign of the moving direction of the lens and that the lens has moved over the unit distance.

The pulse signals output from the encoders 22, 24 are input to the counter 26. When the pulse signal indicating movement over a unit distance in the positive direction is input to the counter 26, the value (count value) of the counter 26 is incremented by one. When the pulse signal indicating movement over a unit distance in the negative direction is input to the counter 26, the count value of the counter 26 is decremented by one.

The counter 26 counts a pulse signal for each of the encoders 22, 24. The respective count values are provided to the computing portion 17 in the CPU 16 as data (values) indicating the current position of the zoom lens ZL (i.e., the zoom position of the taking lens) and the current position of the focus lens FL (i.e., the focus position of the taking lens), and the respective count values are used for controlling the zoom lens ZL and the focus lens FL. At the time of initial settings, the zoom lens ZL is moved to either the wide end or the telescopic end. The focus lens FL is moved to either the close range end or the infinity end. At that time, the count value of the counter 26 is reset to 0.

The position detection portion of the present invention that performs the above-described the function is not limited to the encoders 22, 24 and the counter 26, and may also include a potentiometer which outputs an absolute value, a magnetoresistive sensor (MR sensor), a position sensitive detector (PSD) and a hole device. Further the number of pulse signals for driving the motor ZM or FM may be used for detecting the zoom or focus position. However, the encoder is advantageous over the potentiometer in consideration of the accuracy and resolving power required by the virtual system.

On the basis of data pertaining to the current zoom position and the current focus position, which are sequentially obtained by the encoders 22, 24 and the counter 26, the computing portion 17 computes an angle of view, an object distance, and a principal point position, all pertaining to the taking lens obtained at that time, through use of the lens data stored in the ROM 28, as will be described later. The thus-computed data pertaining to the angle of view, the object distance, and the principal point position are transmitted as photographing data to the photographing data collection portion 40 of the virtual system 32 through an SCI (serial communication interface) as the output portion 30. As a result, the virtual system 32 can ascertain settings of the photographing conditions of the real camera. The photographing conditions of the virtual camera can be made coincide with those of the actual camera. The computing portion 17 sequentially computes the angle of view, the object distance, and the principal point position, all pertaining to the taking lens, and the SCI 30 sequentially transmits data pertaining to results of computation to the photographing data collection portion 40. As a result, the photographing conditions of the virtual camera are changed in association with camera work stemming from the zooming or focusing actions of the actual camera, whereupon an electronic video of the virtual space associated with the camera work of the actual camera is generated. When the virtual system 32 requires information about a focal length as information about the angle of view of the taking lens of the actual camera, the computing portion 17 may compute the focal length of the taking lens instead of the angle of view, and the SCI 30 may transmit the information to the virtual system.

As the storage portion 28 of the present invention, any well-known information storage structure may be employed. For example, but not by way of limitation, ROM, FEPROM, flash ROM, backup ROM and various types of disk such as an optical or magnetic disk and a portable memory storage may be employed.

The output portion 30 of the present invention that performs the above-described the function is not limited to the SCI 30, and may also include a parallel port interface and an analog voltage output interface.

Figure 2A:
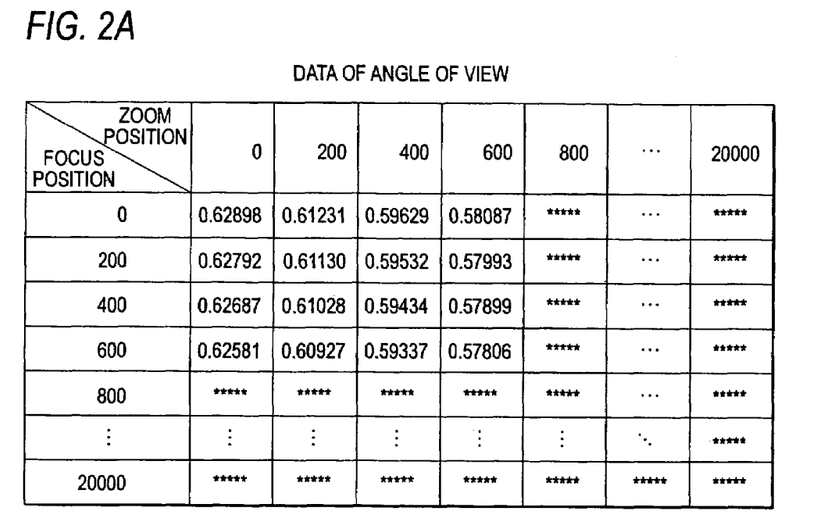
FIGS. 2A and 2B each is a view showing an example of lens data to be stored in ROM.
Figure 2B:
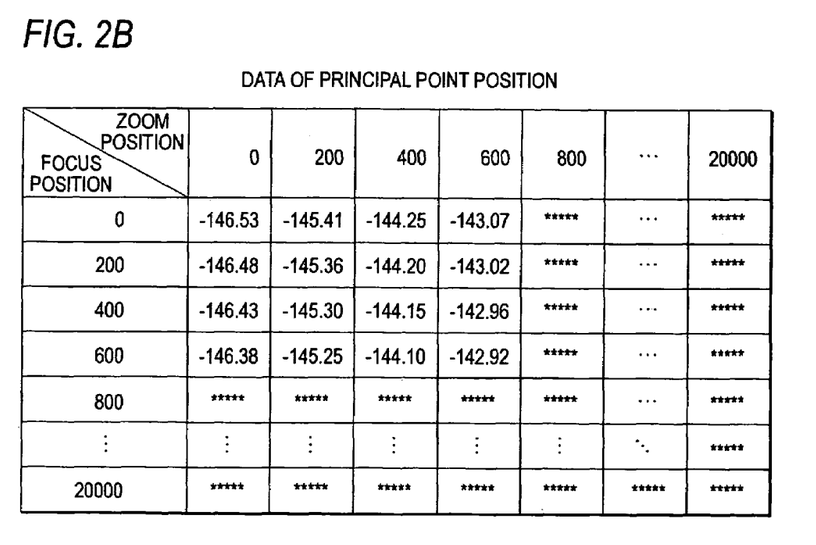

Subsequently, there will be described processing for computing data pertaining to the angle of view, the object distance, and the principal point position, from the data pertaining to the zoom and focus positions of the taking lens. Lens data showing a relationship among the zoom position, the focus position, the angle of view, the object distance, and the principal point position are prepared beforehand on the basis of optical design data pertaining to the taking lens and registered in the ROM 28 to which the computing portion 17 makes a reference. FIGS. 2A and 2B are views illustrating a portion of the lens data. As illustrated in these drawings, the lens data are stored in the form of a table. In association with values about the zoom position and the focus position detected by the encoders 22, 24 and the counter 26 (count values 0 to 20000 of the counter 26), values which pertain to the angle of view, the object distance, and the principal point position and which are obtained at the respective zoom and focus positions are stored. FIG. 2A shows values which pertain to the angle of view and which are obtained at respective zoom and focus positions (values of $\tan\theta$ with respect to the angle of view $\theta$). FIG. 2B shows lens data showing values (in mm) which pertain to the principal point position and which are obtained at the respective zoom and focus positions. Although lens data showing values pertaining to the object distance are omitted, the values are also prepared in the same manner as are the lens data pertaining to the angle of view and the principal point position. The principal point position is indicated as a distance from a reference surface (flange) of the lens barrel of the taking lens to which the lens mount is attached.

The zoom position and the focus position can be detected with high resolving power. However, if the lens data are prepared for each resolving power, an enormous memory size will be required. Therefore, in view of the storage capacity of the ROM 28, the lens data—corresponding to a position requiring lower resolving power than the resolving power required for the zoom and focus positions—are stored in the ROM 28. The lens data are design values theoretically computed through use of the optical design data pertaining to the taking lens. Values pertaining to the object distance and the principal point position are stored with respect to a comparatively large number of points of the zoom and focus positions (tens of points for each position).

When acquiring the current zoom position and the current focus position to compute the angle of view, the object distance, and the principal point position, the computing portion 17 refers to the lens data stored in the ROM 28. At this time, when acquiring the values pertaining to the current zoom position and the current focus position from the counter 26, and when data corresponding directly to the values are available, the computing portion 17 read the angle of view, the object distance, and the principal point position from the data. Meanwhile, when data corresponding directly to the current zoom position and the current focus position are not available, data pertaining to adjacent values on both sides of the values for the positions or data larger than the values are read from the ROM 28 and interpolated. The angle of view, the object distance, and the principal point position, all corresponding to the current zoom position and the current focus position acquired from the counter 26, are determined from the interpolated values. Thereby, values which pertain to the angle of view, the object distance, and the principal point position and which correspond to the values pertaining to the zoom and focus positions acquired from the counter 26, are computed on the basis of the lens data.

The lens data stored in the ROM 28 are not the design values theoretically determined from the optical design data pertaining to the taking lens but may be actually-measured values. For instance, the lens device 10 is attached to a standard camera when the camera is shipped from a factory. A subject for use in actual measurement is photographed, whereby a photographed image of the subject is acquired. The zoom and focus positions are changed in increments of several points to tens of points, and images are photographed at the respective points. On the basis of the photographed images, the angle of view, the object distance, and the principal point position are actually measured at the respective zoom and focus positions. The resultant actually-measured values are stored in the ROM 28 as lens data. Thereby, no errors do not arise in the lens data because of a manufacturing error, an error in the position sensor, or the like. Thus, the lens data are suitable for a system which requires a higher degree of accuracy. Operation for acquiring such actually-measured values requires consumption of much time and labor. Therefore, actually-measured values are not employed for all of the lens data, but deficient portions of the lens data may be compensated by the design values.

Figure 3:
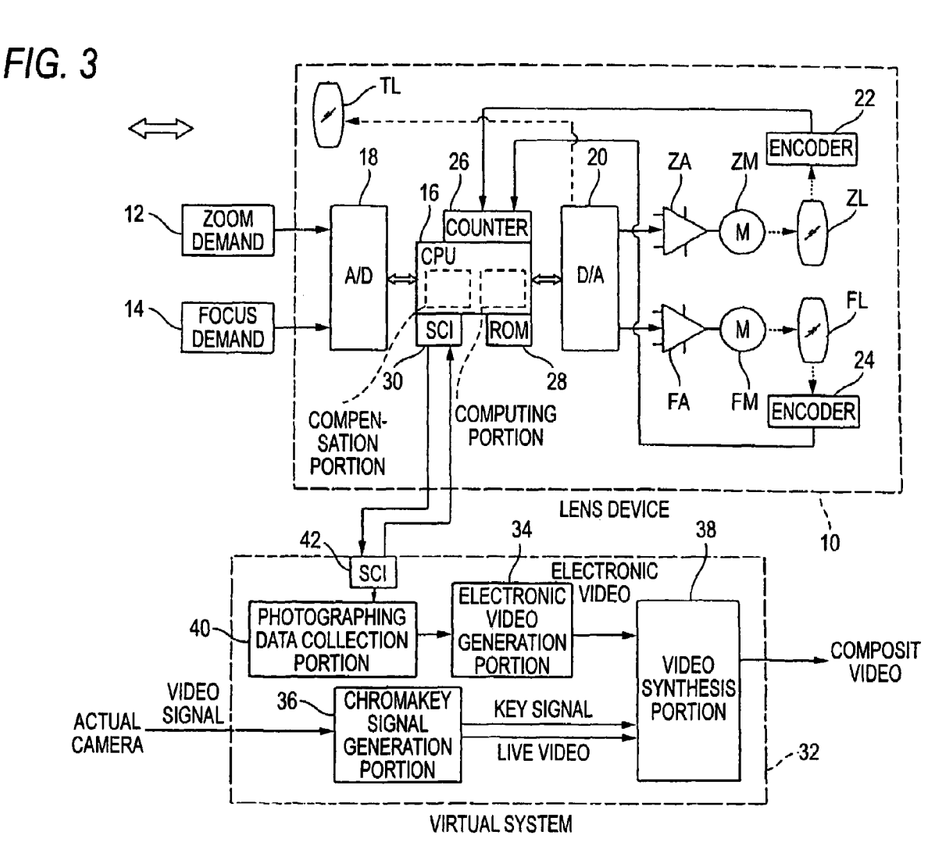
FIG. 3 is a block diagram showing the configuration of a lens system to which the present invention is applied and the configuration of a virtual system.

The taking lens is generally provided with a mechanism for adjusting back focus (i.e., flange back) according to the nature of a camera (camera main body) on which the taking lens is mounted. FIG. 3 is a block diagram showing the configuration of a lens system having an adjusting portion for adjusting back focus of a taking lens. Constituent parts the same as those in FIG. 1 are referred to by numerals the same as those in FIG. 1. As illustrated in the drawing, in this embodiment, the taking lens has a tracking lens (or lens group) TL as the adjusting portion, and lens system includes a compensation portion 19 for compensating a change in photographing data stemming from the adjusting of back focus. The tracking lens TL is arranged in some of master lenses or lens group (not shown) so as to be movable in the direction of the optical axis, thereby enabling adjustment of the back focus of the taking lens by means of adjusting the position of the tracking lens, or the like. In this case, the relationship among the zoom and focus positions, the angle of view, the object distance, and the principal point position is changed according to an adjustment value for back focus (the adjustment value is a value showing the position of the tracking lens TL when adjustment is performed through use of the tracking lens TL). Therefore, there may be a case where the compensation portion 19 can correct the lens data according to the adjustment value of the back focus. For instance, the lens data achieved when the back focus is set to the reference adjustment value are stored in the ROM 28 in the form of a design value or the actually-measured value. The relationship among a change in the reference adjustment value for the back focus and changes in values which pertain to the angle of view, the object distance, and the principal point position and which are obtained at the respective values for the zoom and focus positions is determined from the design value or actually-measured values. The thus-determined relationship is stored in the ROM 28 as correction amount data. Moreover, the adjustment value for back focus is arranged so that the value can be automatically gained by the compensation portion 19. By means of this arrangement, when the reference adjustment value has changed by back focus adjustment, the compensation portion 19 determines the values that pertain to the angle of view, the object distance, and the principal point position and that correspond to the values for the zoom and focus positions, based on the lens data. The compensation portion 19 also determines the amount of correction required to correct the values—the amount corresponding to the amount of change in the reference adjustment value for back focus—from correction amount data. Thereby, data—which pertain to the angle of view, the object distance, and the principal point position and which are output as photographing data—can be corrected to an appropriate value. In a case where the correction amount data are formed from data pertaining to discrete values which represent the amount of change in the reference adjustment value for back focus and data showing the amount of correction assigned to the respective discrete values, when data corresponding directly to the amount of change in the reference adjustment value for back focus are not available, data whose values are close to those of the directly-corresponding data are read from the correction amount data and interpolated, thereby determining the amount of correction corresponding to the amount of change in the reference adjustment value for back focus.

The CPU 16 containing the computing portion 17 and the compensation portion 19 of the present invention can be a general purpose computer that performs the above-described functions and that contains instructions for performing the below-described processing procedures. The general purpose computer may also include an operational amplifier (OPAMP), a multiplier, and a computer-readable medium or a data carrier that performs the above-described functions and that contains instructions for performing the below-described processing procedures.

Figure 4:
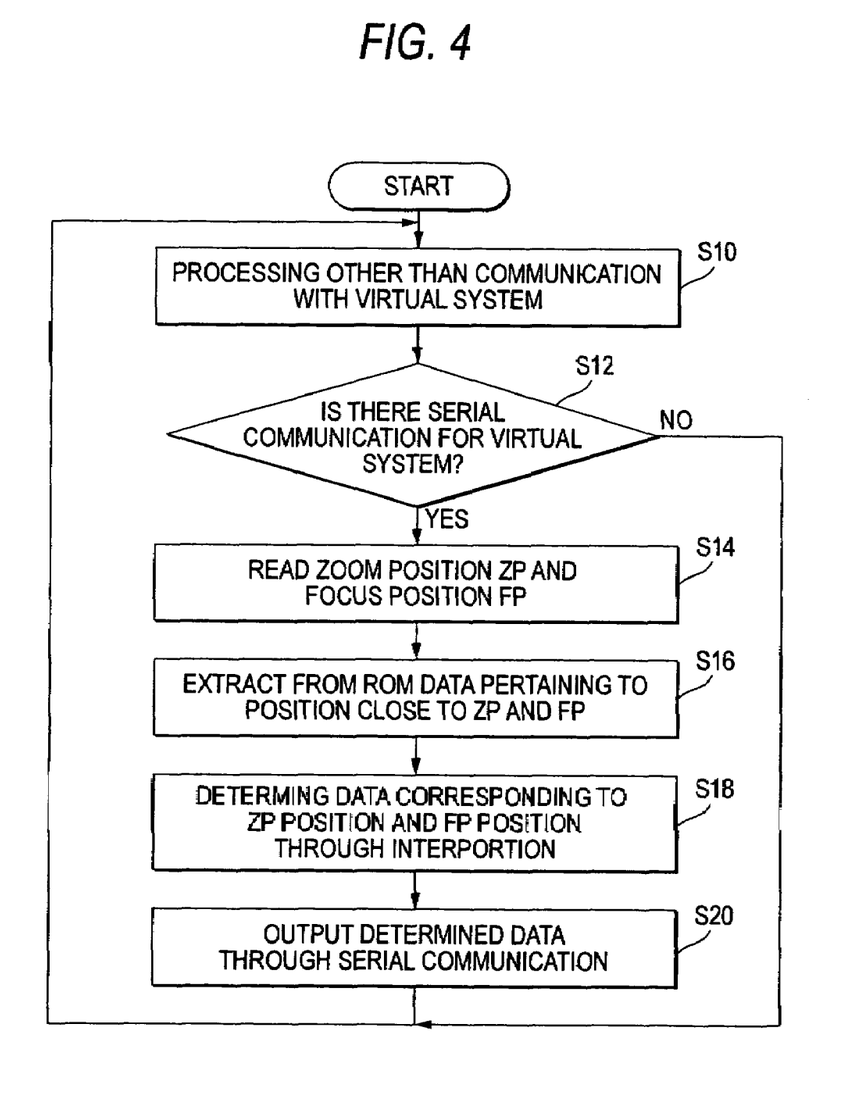
FIG. 4 is a flowchart showing processing procedures of a CPU in a lens device pertaining to communication with a virtual system.

Processing procedures of the CPU 16 pertaining to communication with the virtual system 32 will now be described by reference to a flowchart shown in FIG. 4. When having started processing, the CPU 16 performs processing other than communication with the virtual system 32 (step S10). Subsequently, a determination is made as to whether or not serial communication is established with the virtual system 32 (step S12). When NO is selected, processing returns to step S10 bypassing the following processing.

When YES is selected, the current zoom position ZP and the current focus position FP are read from the counter 26 (step S14). Subsequently, among the lens data stored in the ROM 28, data pertaining to positions close to the zoom position ZP and the focus position FP are extracted from the ROM 28 (step S16). Data pertaining to the angle of view, the object distance, and the principal point position, all corresponding to the zoom position ZP and the focus position FP, are determined through interpolation (step S18).

The CPU 16 outputs the thus-determined data to the virtual system 32 as photographing data through serial communication (step S20). After the previously-described processing has been completed, processing returns to step S10.

In the embodiment, the data pertaining to the angle of view, the object distance, and the principal point position are output from the lens device 10 to the virtual system 32. However, there may also be possible that an "f" number (diaphragm stop) of the taking lens is detected; that the depth of field is determined on the basis of the "f" number; and that data pertaining to the depth of field are output. When not all of the data pertaining to the angle of view, the object distance, and the principal point position are output to the virtual system 32 and when any of the data pertaining to the angle of view, the object distance, and the principal point position are output, the present invention is still effective. Even when the lens system of the present invention is used for a video processing system that requires photographing data pertaining to the angle of view, the object distance, and the principal point position rather than when the present invention is used for the virtual system 32 as in the case of the previously-described embodiment, the present invention is still effective.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The present application claims foreign priority based on Japanese Patent Application No. JP2004-60722, filed Mar. 4 of 2004, the contents of which is incorporated herein by reference.

What is claimed is:

1. A virtual system for controlling zooming and focusing of a taking lens, which comprises:
   a first position detection unit that detects a zoom position of the taking lens;
   a second position detection unit that detects a focus position of the taking lens;
   a computing unit that computes photographing data of the taking lens on the basis of the zoom position and the focus position detected by the first position detection unit or the second position detection unit, wherein the photographing data comprises a principal point position of the taking lens, an object distance, and at least one of an angle view of the taking lens or a focal length of the taking lens; and
   an output unit that outputs the photographing data computed by the computing unit.

2. The virtual system according to claim 1, wherein the photographing data further comprises both an angle of view of the taking lens and a focal length of the taking lens.

3. The virtual system according to claim 1, which further comprises a storage unit that stores lens data showing a relationship among the zoom position, the focus position, and the photographing data, wherein the computing unit computes the photographing data on the basis of the lens data.

4. The virtual system according to claim 3, wherein the lens data comprises a design value determined from design data of the taking lens or actual measurement data obtained through actual measurement.

5. The virtual system according to claim 1, wherein the taking lens has an adjustment unit that performs an adjustment of a flange back of the taking lens, and the lens system further comprises a compensation unit that compensates a change in the photographing data, the change stemming from the adjustment of the flange back.

6. The virtual system according to claim 1, wherein the output unit outputs the photographing data to a video processing system.

7. A virtual system for controlling zooming and focusing of a taking lens, which comprises:
   means for detecting a zoom position of the taking lens;
   means for detecting a focus position of the taking lens;
   means for computing photographing data of the taking lens on the basis of the zoom position and the focus position, wherein the photographing data comprises a principal point position of the taking lens, an object distance, and at least one of an angle view of the taking lens or a focal length of the taking lens; and
   means for outputting the photographing data.

8. The virtual system according to claim 7, which further comprises means for storing lens data that show a relationship among the zoom position, the focus position, and the photographing data, wherein the means for computing the photographing data computes the photographing data on the basis of the lens data.

9. The virtual system according to claim 7, which further comprise means for compensating a change in the photographing data, wherein the change is stemming from an adjustment of a flange back of the taking lens.

10. The virtual system according to claim 7, wherein the photographing data further comprises both an angle of view of the taking lens and a focal length of the taking lens.

* * * * *